(12) United States Patent  
Takesue et al.

(10) Patent No.: US 8,446,641 B2
(45) Date of Patent: May 21, 2013

(54) IMAGE PROCESSING APPARATUS AND IMAGE PROCESSING METHOD

(75) Inventors: Toshihiro Takesue, Tokyo (JP); Kenichi Ono, Tokyo (JP); Nobuyoshi Kaima, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 170 days.

(21) Appl. No.: 13/064,101

(22) Filed: Mar. 7, 2011

(65) Prior Publication Data

US 2011/0222085 A1    Sep. 15, 2011

(30) Foreign Application Priority Data

Mar. 9, 2010  (JP) .................................. 2010-052258
Oct. 5, 2010   (JP) .................................. 2010-225934
Jan. 21, 2011  (JP) .................................. 2011-010865

(51) Int. Cl.
  *H04N 1/409* (2006.01)
(52) U.S. Cl.
  USPC ........... 358/3.26; 358/1.9; 358/3.07; 358/3.1; 358/3.2; 358/504; 358/536
(58) Field of Classification Search
  USPC .................. 358/1.9, 3.07, 3.1, 3.26, 3.2, 504, 358/536
  See application file for complete search history.

(56) References Cited

U.S. PATENT DOCUMENTS

| 4,611,349 A | 9/1986 | Hou |
| 6,762,858 B2 * | 7/2004 | Haro ............................ 358/1.9 |
| 2003/0174364 A1 * | 9/2003 | Goto ............................ 358/3.26 |
| 2005/0213064 A1 * | 9/2005 | Katayama et al. ............. 355/52 |
| 2007/0139715 A1 | 6/2007 | Kazama et al. |
| 2008/0239336 A1 | 10/2008 | Tanabe et al. |
| 2008/0309951 A1 | 12/2008 | Kishi et al. |

FOREIGN PATENT DOCUMENTS

| EP | 0 866 603 | 9/1998 |
| EP | 1 292 115 | 3/2003 |
| EP | 1 491 349 | 12/2004 |
| EP | 0 370 271 | 5/2009 |
| JP | 4253843 B2 | 2/2009 |
| JP | 2009083472 A | 4/2009 |

OTHER PUBLICATIONS

Search Report dated Jun. 29, 2011 by the European Patent Office for corresponding European Patent Application No. 11157465.3.
JP-2005-117615 (English Abstract).
JP-2009-083472 (English Abstract).

* cited by examiner

*Primary Examiner* — Benny Q Tieu
*Assistant Examiner* — Quyen V Ngo
(74) *Attorney, Agent, or Firm* — Harness, Dickey & Pierce, P.L.C.

(57) ABSTRACT

An image processing apparatus includes a correcting unit that performs enlarging or reducing correction on an image to be processed by determining an arrangement of pixels that are to be added to or deleted from gradational image data of the image to be processed based on an angle at which the pixels are to be arranged with respect to a horizontal direction of the image to be processed or with respect to a vertical direction of the image to be processed, and a pixel array control unit that changes the angle at which the pixels are arranged based on a test image of the image data to be processed after being corrected by the correcting unit.

8 Claims, 18 Drawing Sheets

FIG. 9A

|    | R0 | R1 | R2 | R3 | R4 | R5 | R6 |
|----|----|----|----|----|----|----|----|
| F0 | a0 | a1 | a2 | a3 |    |    |    |
| F1 | b0 | b1 | b2 | b3 |    |    |    |
| F2 | c0 | c1 | c2 | c3 |    |    |    |
| F3 |    |    |    |    |    |    |    |
| F4 |    |    |    |    |    |    |    |
| F5 |    |    |    |    |    |    |    |
| F6 |    |    |    |    |    |    |    |
| F7 |    |    |    |    |    |    |    |
| F8 |    |    |    |    |    |    |    |
| F9 |    |    |    |    |    |    |    |
| F10 |   |    |    |    |    |    |    |
| F11 |   |    |    |    |    |    |    |
| F12 | h0 | h1 | h2 | h3 |    |    |    |
| F13 | i0 | i1 | i2 | i3 |    |    |    |
| F14 | j0 | j1 | j2 | j3 |    |    |    |
| F15 | k0 | k1 | k2 | k3 |    |    |    |
| F16 |   |    |    |    |    |    |    |
| F17 |   |    |    |    |    |    |    |
| F18 |   |    |    |    |    |    |    |
| F19 |   |    |    |    |    |    |    |
| F20 |   |    |    |    |    |    |    |
| F21 |   |    |    |    |    |    |    |
| F22 |   |    |    |    |    |    |    |
| F23 |   |    |    |    |    |    |    |
| F24 |   |    |    |    |    |    |    |

FIG. 9B

|    | R0 | R1 | R2 | R3 | R4 | R5 | R6 |
|----|----|----|----|----|----|----|----|
| F0 | *  |    |    |    | *  |    |    |
| F1 |    |    |    |    |    |    |    |
| F2 |    |    |    |    |    |    |    |
| F3 |    |    |    |    |    |    |    |
| F4 |    |    |    |    |    |    |    |
| F5 |    |    |    |    |    |    |    |
| F6 |    |    |    |    |    |    |    |
| F7 |    |    |    |    |    |    |    |
| F8 |    |    |    |    |    |    |    |
| F9 |    |    |    |    |    |    |    |
| F10 |   |    |    |    |    |    |    |
| F11 |   |    |    |    |    |    |    |
| F12 |   |    |    |    |    |    |    |
| F13 |   |    |    |    |    |    |    |
| F14 | * |    |    |    | *  |    |    |
| F15 |   |    |    |    |    |    |    |
| F16 |   |    |    |    |    |    |    |
| F17 |   |    |    |    |    |    |    |
| F18 |   |    |    |    |    |    |    |
| F19 |   |    |    |    |    |    |    |
| F20 |   |    |    |    |    |    |    |
| F21 |   |    |    |    |    |    |    |
| F22 |   |    |    |    |    |    |    |
| F23 |   |    |    |    |    |    |    |
| F24 |   |    |    |    |    |    |    |

FIG. 9C

|    | R0 | R1 | R2 | R3 | R4 | R5 | R6 |
|----|----|----|----|----|----|----|----|
| F0 | b0 | a1 | a2 | a3 |    |    |    |
| F1 | c0 | b1 | b2 | b3 |    |    |    |
| F2 | d0 | c1 | c2 | c3 |    |    |    |
| F3 | e0 |    |    |    |    |    |    |
| F4 |    |    |    |    |    |    |    |
| F5 |    |    |    |    |    |    |    |
| F6 |    |    |    |    |    |    |    |
| F7 |    |    |    |    |    |    |    |
| F8 |    |    |    |    |    |    |    |
| F9 |    |    |    |    |    |    |    |
| F10 |   |    |    |    |    |    |    |
| F11 | h0|    |    |    |    |    |    |
| F12 | i0| h1 | h2 | h3 |    |    |    |
| F13 | j0| i1 | i2 | i3 |    |    |    |
| F14 | k0| k1 | j2 | j3 |    |    |    |
| F15 | l0| l1 | k2 | k3 |    |    |    |
| F16 | m0| m1 |    |    |    |    |    |
| F17 |   |    |    |    |    |    |    |
| F18 |   |    |    |    |    |    |    |
| F19 |   |    |    |    |    |    |    |
| F20 |   |    |    |    |    |    |    |
| F21 |   |    |    |    |    |    |    |
| F22 |   |    |    |    |    |    |    |
| F23 |   |    |    |    |    |    |    |
| F24 |   |    |    |    |    |    |    |

FIG. 9D

| -1 | 0 | 0 | 0 |
|----|---|---|---|

FIG. 9E

| -1 | -1 | 0 | 0 |
|----|----|---|---| n DEGREES

-n DEGREES

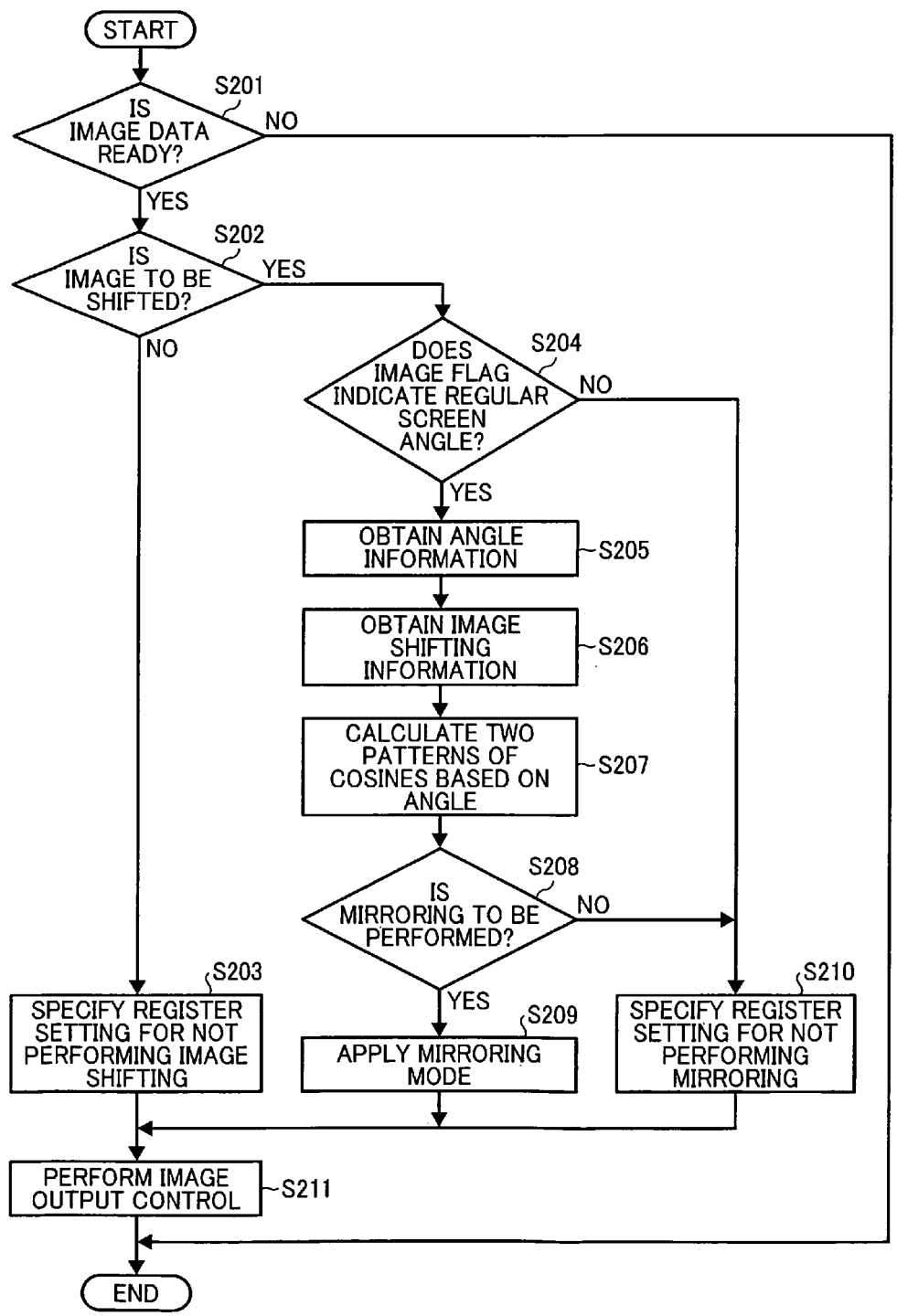

IMAGE PROCESSING APPARATUS AND IMAGE PROCESSING METHOD

CROSS-REFERENCE TO RELATED APPLICATIONS

The present application claims priority to and incorporates by reference the entire contents of Japanese Patent Application No. 2010-052258 filed in Japan on Mar. 9, 2010, Japanese Patent Application No. 2010-225934 filed in Japan on Oct. 5, 2010 and Japanese Patent Application No. 2011-010865 filed in Japan on Jan. 21, 2011.

BACKGROUND OF THE INVENTION

1. Field of the Invention

The present invention relates to an image processing apparatus and an image processing method.

2. Description of the Related Art

Conventionally, some image forming apparatuses using an electrophotographic process, such as laser printers and digital copying machines, have used multiple beams in optical scanning to speed up image formation and to increase image density.

Upon performing duplex printing, such an image forming apparatus records an image on the first side of a sheet, fixes the image thereon, and records another image on the second side. A scaling difference of 0.2 percent to 0.4 percent occurs between the image printed on the first side and the image printed on the second side. Such a scaling difference is caused by lost moisture in the sheet, and the scaling difference varies depending on the type of the sheet.

Therefore, to adjust scaling and to correct a distortion, correction processes such as thinning out or insertion of pixels are performed, for example. Japanese Patent Application Laid-open No. 2009-83472, for example, discloses an invention of an image forming apparatus and the like that perform enlarging correction on an image by periodically adding pixels along a vertical direction and a horizontal direction of image data.

In addition, Japanese Patent No. 4253843 discloses an invention of an image forming apparatus that performs an image scanning process where regularly arranged pixels are added or deleted. In the invention according to Japanese Patent No. 4253843, deterioration of image quality during the process of enlarging or reducing the image is prevented by utilizing the information about the positions of pixels to be added or deleted during the screen process.

However, the invention of the image forming apparatus and the like disclosed in Japanese Patent Application Laid-open No. 2009-83472 has not considered about changing the positions of the pixels to be added or deleted based on the characteristics of an image. Furthermore, in the invention of the image forming apparatus and the like disclosed in Japanese Patent No. 4253843, the screen process is performed every time the positions of the pixels to be added or deleted are changed, and, therefore, the screen process must be performed every time there is a scaling difference.

The present invention is made in consideration of the above, and to solve these problems. An object of the present invention is to provide an image processing apparatus and an image processing method that can easily reduce image degradation during the process of enlarging and reducing an image.

SUMMARY OF THE INVENTION

It is an object of the present invention to at least partially solve the problems in the conventional technology.

According to one aspect of the present invention, an image processing apparatus includes a correcting unit that performs enlarging or reducing correction on an image to be processed by determining an arrangement of pixels that are to be added to or deleted from gradational image data of the image to be processed based on an angle at which the pixels are to be arranged with respect to a horizontal direction of the image to be processed or with respect to a vertical direction of the image to be processed, and a pixel array control unit that changes the angle at which the pixels are arranged based on a test image of the image data to be processed after being corrected by the correcting unit.

According to another aspect of the present invention, an image processing method includes performing enlarging or reducing correction on an image to be processed by determining an arrangement of pixels that are to be added to or deleted from gradational image data of the image to be processed based on an angle at which the pixels are to be arranged with respect to a horizontal direction of the image to be processed or with respect to a vertical direction of the image to be processed, and changing the angle at which the pixels are arranged based on a test image of the image data to be processed after being corrected at the performing correction.

According to still another aspect of the present invention, an image processing apparatus includes a correcting unit that performs enlarging or reducing correction on an image to be processed by determining an arrangement of pixels that are to be added to or deleted from gradational image data of the image to be processed based on an angle at which the pixels are to be arranged with respect to a horizontal direction of the image to be processed or with respect to a vertical direction of the image to be processed, and a pixel array control unit that changes the angle at which the pixels to be added to or deleted from the image data to be processed are arranged depending on a screen angle formed in a screen process applied to the image data to be processed.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIGS. 9A to 9E are schematics for explaining how image data is corrected by an enlarging process or a reducing process where pixels are shifted in the sub-scanning direction;

FIG. 23 is a flowchart of the entire image shifting controlling process.

DETAILED DESCRIPTION OF THE PREFERRED EMBODIMENTS

An embodiment of the present invention will now be explained with reference to some drawings.

Figure 1:
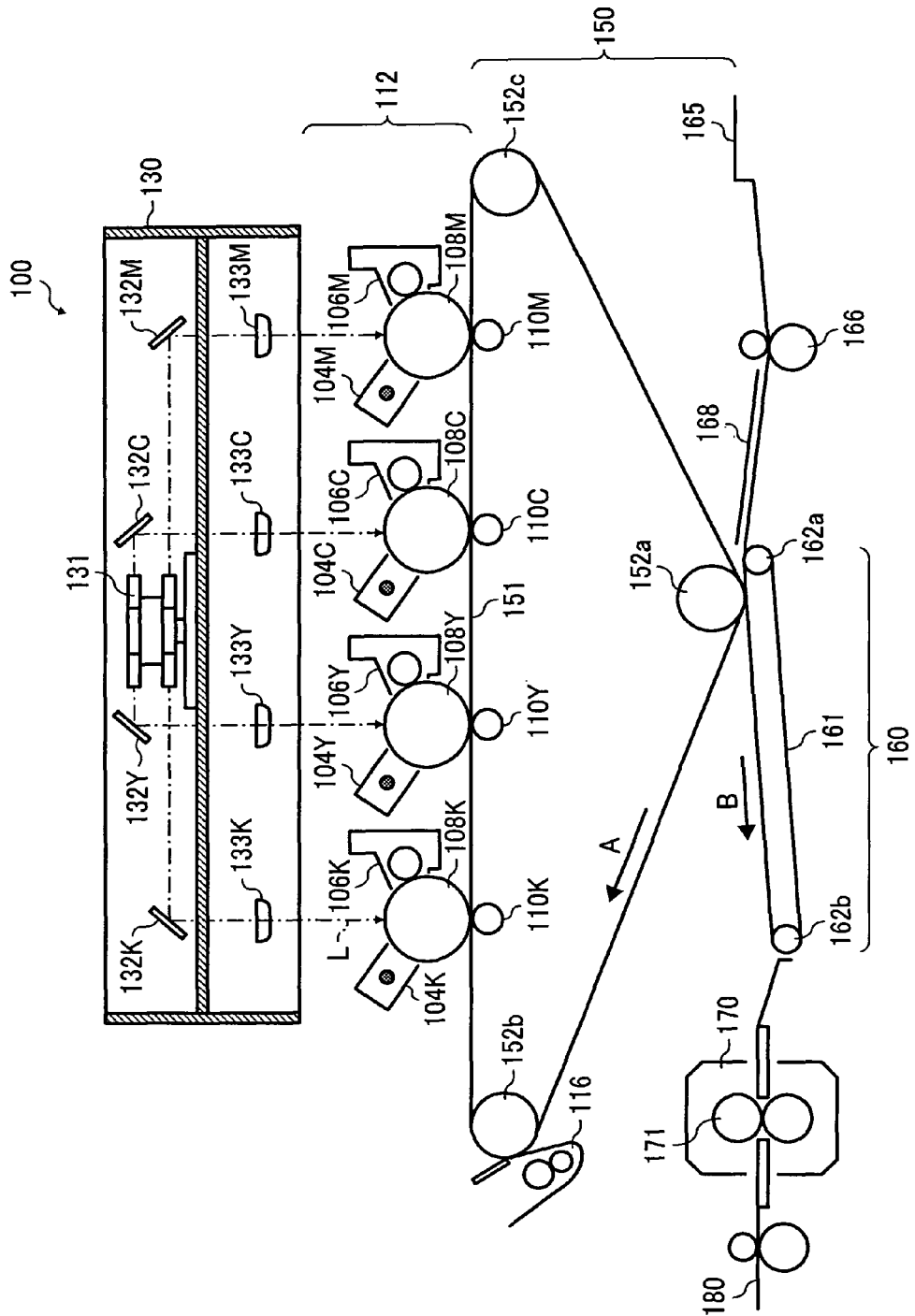
FIG. 1 is a schematic of a structure of an image forming apparatus according to an embodiment of the present invention, depicting mainly a portion around an engine unit thereof.

FIG. 1 is a schematic of a structure of an image forming apparatus 100 according to an embodiment of the present invention, depicting mainly a portion around an engine unit thereof. The image forming apparatus 100 performs writing to a photosensitive element using a vertical cavity surface emitting laser (VCSEL) to form a latent image, develops the latent image, and transfers the image onto a recording medium.

The image forming apparatus 100 forms an image using an intermediate transfer system with a tandem structure. In FIG. 1, the reference capital letters "K", "Y", "C", and "M" respectively indicate units related to image formation in the colors "black (K)", "yellow (Y)", "cyan (C)", and "magenta (M)". In the explanation of the embodiment below, a reference numeral without a suffix "K", "Y", "C", or "M" is used upon explaining about a unit having the same function and the same structure for these colors.

The image forming apparatus 100 includes an optical unit 130, an image forming unit 112, a primary transfer unit 150, a secondary transfer unit 160, and a fixing unit 170. The optical unit 130 is a post-object type unit that does not use any fθ lens. The optical unit 130 includes a polygon mirror 131, a reflecting mirror 132K, a reflecting mirror 132Y, a reflecting mirror 132C, a reflecting mirror 132M, a second cylindrical lens 133K, a second cylindrical lens 133Y, a second cylindrical lens 133C, and a second cylindrical lens 133M.

Light beams L output from the VCSEL and condensed by a first cylindrical lens not illustrated are incident on the polygon mirror 131. The light beams L are generated in the number corresponding to the colors. The polygon mirror 131 deflects the respective light beams L to the corresponding reflecting mirrors 132, each of which is for the corresponding color.

After being deflected on the polygon mirror 131, the light beams L are reflected on the respective reflecting mirrors 132, collected again on the respective second cylindrical lenses 133, and expose respective photosensitive elements 108.

Because the photosensitive elements 108 are irradiated with the light beams L output from a plurality of optical elements, the operational timings of the light beams L are synchronized both in a main-scanning direction and a sub-scanning direction. The main-scanning direction herein means a direction to be scanned with the light beams, and the sub-scanning direction herein means a direction perpendicular to the main-scanning direction.

The image forming unit 112 includes a photosensitive element 108K, a photosensitive element 108Y, a photosensitive element 108C, a photosensitive element 108M, a charging unit 104K, a charging unit 104Y, a charging unit 104C, a charging unit 104M, a developing unit 106K, a developing unit 106Y, a developing unit 106C, and a developing unit 106M.

Each of the photosensitive elements 108 has a conductive element made of a material such as aluminum covered with a photoconductive layer including a charge generating layer and a charge transporting layer. Each of the charging units 104 includes a corotron, a scorotron, a roller charging device, or the like, to apply a surface charge to the photoconductive layer of the photosensitive element 108. This causes the photosensitive element 108 to retain an electrical static charge.

The light beams L expose the electrical static charge applied on the photosensitive elements 108 in the form of an image, and electrical static latent images are formed thereon. Each of the developing units 106 develops the electrical static latent image formed on the photosensitive element 108. The developing unit 106 includes a developing sleeve, a developer supplying roller, and a restricting blade, for example.

The primary transfer unit 150 includes an intermediate transfer belt 151, a carriage roller 152a, a carriage roller 152b, a carriage roller 152c, a primary transfer roller 110K, a primary transfer roller 110Y, a primary transfer roller 110C, a primary transfer roller 110M, and a cleaning unit 116.

The electrical static latent image formed on the photosensitive element 108 is transferred onto the intermediate transfer belt 151 nipped between the photosensitive element 108 and the primary transfer roller 110. The intermediate transfer belt 151 is moved by the carriage rollers 152a to 152c in the direction indicated by the arrow A. In this manner, the electrical static latent images are transferred onto the intermediate transfer belt 151 in the order of K, Y, C, and M.

The primary transfer roller 110 applies transfer bias to the intermediate transfer belt 151 to transfer the electrical static latent image developed on the photosensitive element 108 onto the intermediate transfer belt 151. The cleaning unit 116 cleans the developer remaining on the intermediate transfer belt 151 after a color-developed image is transferred in the secondary transfer unit 160, and prepares the photosensitive element 108 for the subsequent image forming process.

The secondary transfer unit 160 includes a secondary transfer belt 161, a carriage roller 162a, a carriage roller 162b, a paper cassette 165, and a carriage roller 166. The secondary transfer belt 161 is conveyed by the carriage rollers 162a and 162b, and moved in the direction indicated by the arrow B. A recording medium 168 supplied from the paper cassette 165 is supplied to the secondary transfer belt 161 via the carriage roller 166 and the like. The recording medium 168 is conveyed in a manner sticking on and maintained by the secondary transfer belt 161. Examples of the recording medium 168 include high quality paper and a plastic film. A recording medium on which an image is formed is also referred to as an "image receiving medium".

Secondary transfer bias is applied to a multi-colored developed image transferred onto and carried on the intermediate transfer belt 151, and the image is thus transferred onto the recording medium 168 conveyed on the secondary transfer belt 161. The recording medium 168 carrying the multi-colored developed image as an unfixed image is conveyed by the secondary transfer belt 161 to the fixing unit 170.

The fixing unit 170 includes a fixing member 171. An example of the fixing member 171 is a fixing roller. The fixing roller is made of silicone rubber, fluorine rubber, and the like. The fixing unit 170 presses and heats the recording medium 168 and the multi-colored developed image, and outputs the recording medium 168 as a printout 180 outside of the image forming apparatus 100.

Figure 2:
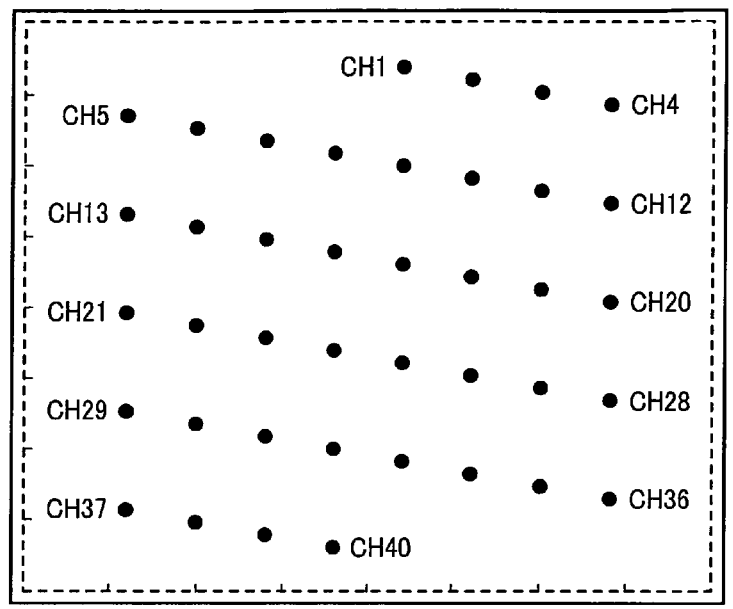
FIG. 2 is a schematic of a structure of a VCSEL.

FIG. 2 is a schematic of a structure of a VCSEL 200 included in the optical unit 130 in the image forming apparatus 100. The VCSEL 200 illustrated in FIG. 2 is a surface emitting semiconductor laser on which a plurality of light sources are arranged in a lattice pattern on a single chip. The VCSEL 200 is a semiconductor array on which a plurality of light sources ch1 to ch40 are arranged in an inclined lattice pattern.

Figure 3:
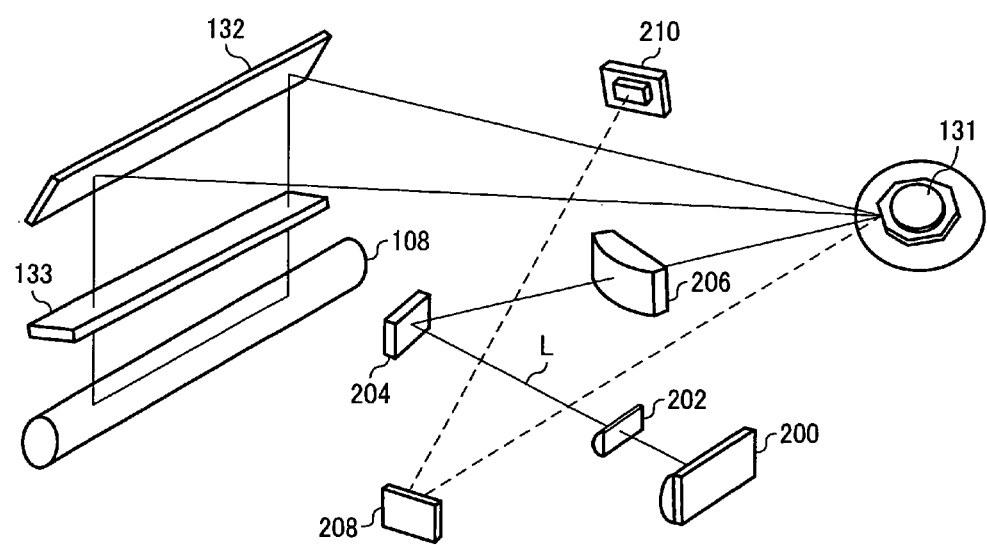
FIG. 3 is a schematic perspective view of the VCSEL and an optical unit exposing a photosensitive element for one color.

FIG. 3 is a schematic perspective view of the VCSEL 200 and the optical unit 130 exposing the photosensitive element 108 for one color. In FIG. 3, the light beams L output from the VCSEL 200 are condensed by the first cylindrical lens 202 that collimates light beams, travel to a reflecting mirror 204 and an imaging lens 206, and are deflected on the polygon mirror 131.

The polygon mirror 131 is driven to rotate by a spindle motor, for example, rotating several thousand to several ten thousand times. The light beams L reflected on the polygon mirror 131 are reflected on the reflecting mirror 132, collimated again by the second cylindrical lens 133, and expose the photosensitive element 108.

A reflecting mirror 208 is arranged to achieve the synchronization of the operational timing at which the light beams L start scanning in the sub-scanning direction. The reflecting mirror 208 reflects the light beams L to a synchronization detecting device 210 before starting scanning in the sub-scanning direction. The synchronization detecting device 210 includes a photodiode, for example. When detecting the light beams L, the synchronization detecting device 210 generates a synchronization signal for starting scanning in the sub-scanning direction so as to synchronize processes such as generation of driving control signals supplied to the VCSEL 200.

The VCSEL 200 is driven by pulse signals received from a GAVD 310 that is to be explained later. In this manner, the light beam L exposes the photosensitive element 108 at the position corresponding to a given image bit of image data, and an electrical static latent image is formed thereon.

Figure 4:
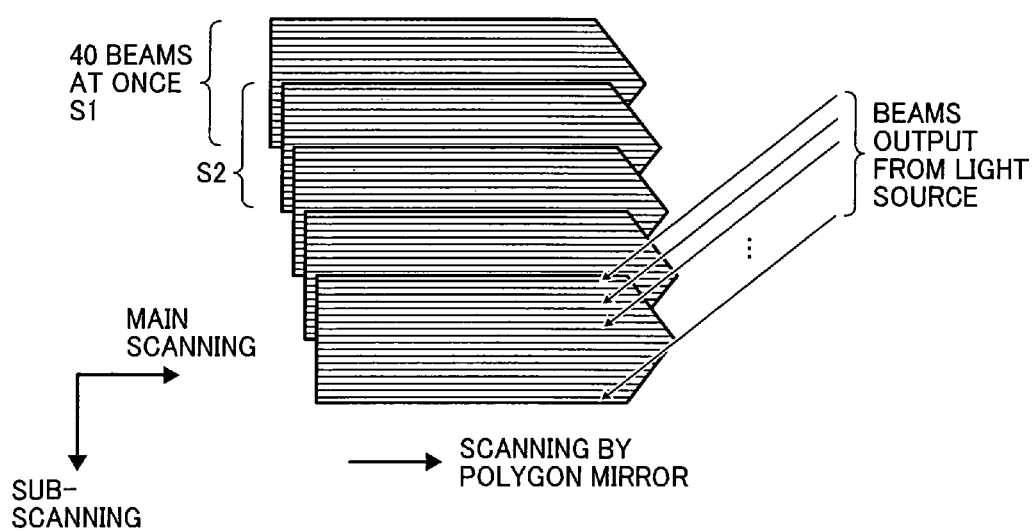
FIG. 4 is a schematic for explaining an interlace scanning technique.

FIG. 4 is a schematic for explaining an interlace scanning technique. The horizontal direction in FIG. 4 corresponds to the main-scanning direction, and the vertical direction corresponds to the sub-scanning direction. As the light beams L, the polygon mirror 131 deflects 40 beams output from the ch1 to the ch40 in the main-scanning direction. In the example of FIG. 4, the light beams L including 40 beams output from the ch1 to the ch40 perform the interlace scanning on the photosensitive element. The former 20 beams in a second beam set (beam set S2) are used for interlace-scanning with respect to the latter 20 beams of a first beam set (beam set S1).

Figure 5:
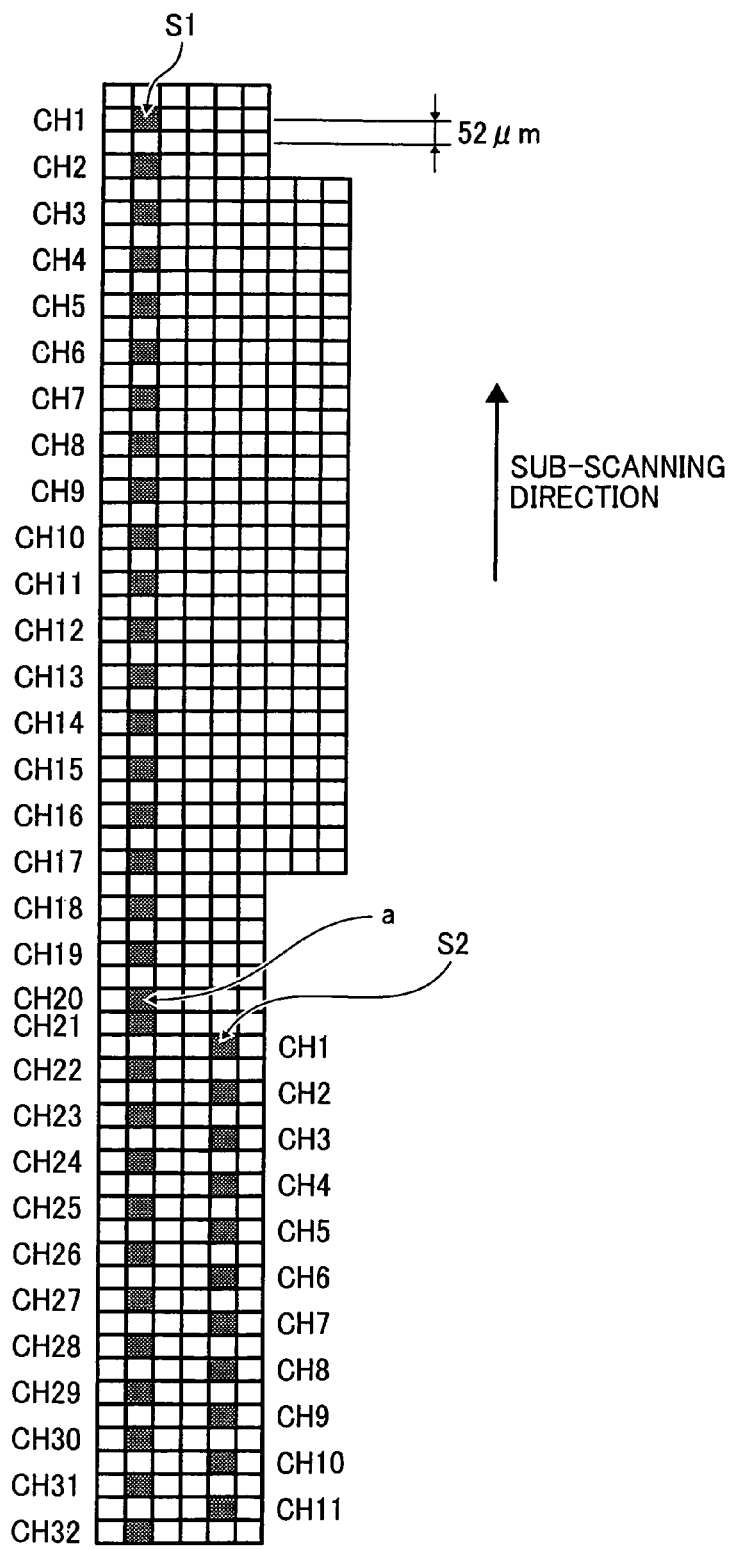
FIG. 5 is a schematic for explaining the interlace scanning more in detail.

FIG. 5 is a schematic for explaining the interlace scanning more in detail. FIG. 5 depicts the beam set S1 and the beam set S2 illustrated in FIG. 4. FIG. 5 depicts only the ch1 to the ch32 out of the beam spot positions formed by the beam set S1, and the ch1 to the ch11 out of the beam spot positions formed by the beam set S2. The ch20 and the ch21 in the beam set S1 are positioned adjacent to each other. The position between these two represents the center of the beam set S1 in the sub-scanning direction, and the beam set S1 is symmetrical along the position "a".

One surface of the polygon mirror 131 causes the beam set S1 to scan, and thereafter the next surface of the polygon mirror 131 causes the beam set S2 to scan. The ch1 in the beam set S2 will come to the position next to the ch20 and the ch21 in the beam set S1. The distance between the beam spots after the interlace scanning is 52 micrometers.

In FIG. 5, scanning performed for one toner is explained, and the scanning relating to each of the colors is performed in the same manner. In this manner, writing in a resolution of 4800 dpi is achieved.

Figure 6:
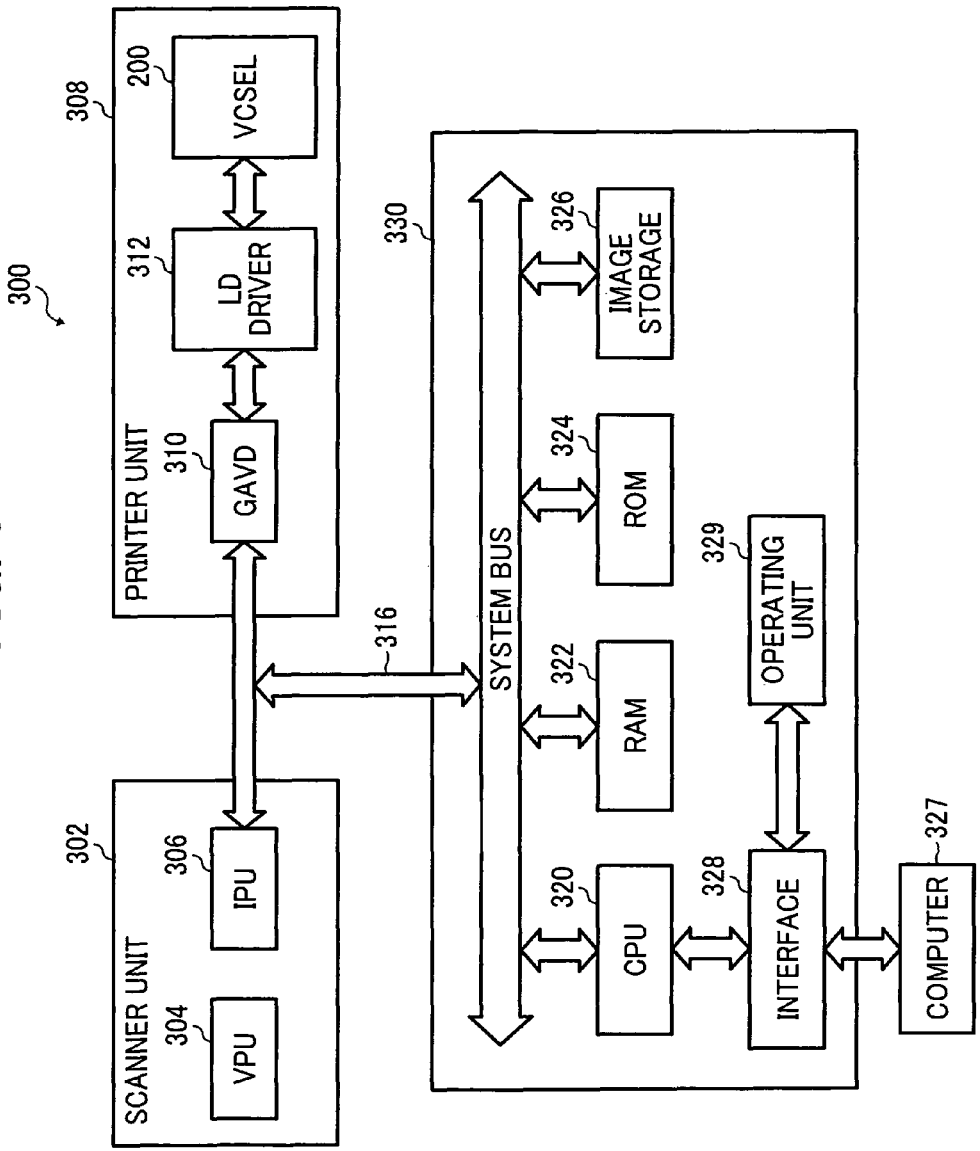
FIG. 6 is a block diagram of a functional configuration of a control unit included in the image forming apparatus according to the embodiment.

FIG. 6 is a block diagram of a functional configuration of a control unit 300 included in the image forming apparatus 100 according to the embodiment. The control unit 300 includes a scanner unit 302, a printer unit 308, and a main control unit 330. The control unit 300 is connected to a computer 327 via a network, for example.

The scanner unit 302 has a function to read an image formed on a medium, and sends the image thus obtained to the printer unit 308 as digital data. The scanner unit 302 includes a visual processing unit (VPU) 304 and an image processing unit (IPU) 306. The VPU 304 performs analog-to-digital (A/D) conversion on an image signal that is optically read, and applies black-level offset correction and shading correction. The IPU 306 performs an image process on the image data thus obtained to convert the image data in red-green-blue (RGB) display colors into image data in cyan-magenta-yellow-black (CMYK) display colors.

The printer unit 308 includes a gate array video driver (GAVD) 310, a laser diode (LD) driver 312, and the VCSEL 200. The GAVD 310 controls driving of the VCSEL 200. The GAVD 310 converts the image data received from the scanner unit 302 or the image data generated by the computer 327 with a command or the like, in such a manner that the data corresponds to a spatial arrangement of the semiconductor laser elements of the VCSEL 200 to realize high resolution processing.

The LD driver 312 supplies a current for driving the semiconductor laser elements to the semiconductor laser elements based on a drive controlling signal generated by the GAVD 310. The VCSEL 200 includes semiconductor laser elements that are arranged two dimensionally.

The scanner unit 302 and the printer unit 308 are connected to the main control unit 330 via a system bus 316. The main control unit 330 outputs instructions to the scanner unit 302 and the printer unit 308 so as to control image scanning and image formation.

The main control unit 330 includes a central processing unit (CPU) 320, a random access memory (RAM) 322, a read-only memory (ROM) 324, an image storage 326, an interface 328, and an operating unit 329. The CPU 320 receives a command from a user via the interface 328 and calls a program module for executing a process corresponding to the command so as to cause the program module to execute a process of a copier, a facsimile, a scanner, or an image storage, for example.

The RAM 322 provides a processing space used by the CPU 320 upon performing processes. The ROM 324 stores therein initial setting data for the CPU 320, control data, computer programs, and the like in a manner available to the CPU 320. The image storage 326 is a fixed or removable storage device such as a hard disk device, a secure digital (SD) card, and a universal serial bus (USB) memory, and stores therein image data obtained by the image forming apparatus 100 to provide the image data for various processes.

The interface 328 receives instructions and the like addressed to the main control unit 330. The operating unit 329 is connected to the interface 328. The interface 328 also transmits and receives signals to and from the computer 327 connected over a network. The operating unit 329 receives inputs of operator instructions, for example.

The operating unit 329 is used by a user, for example, to specify the amount to be shifted in shifting correction applied to an image (to be explained later). If the user specifies the amount to be enlarged or the amount to be reduced used in the shifting correction in units of scale (e.g., in percentage), the operating unit 329 reads the information corresponding to the specified scale that is set in the register from the ROM 324, for example, and sets the setting information thus read to the RAM 322. Alternatively, the user is allowed to directly specify parameters and the like to be set to the register.

When image data obtained by the scanner unit 302 is input to the printer unit 308, the GAVD 310 processes the image data, and an image is output onto the photosensitive element 108 as an electrical static latent image. At this time, the CPU 320 controls positioning of the image receiving medium on which the image is formed, in the main-scanning direction and the sub-scanning direction.

To start a scan in the sub-scanning direction, the CPU 320 outputs a start signal to the GAVD 310. When the GAVD 310 receives the start signal, the IPU 306 starts the scanning process. The GAVD 310 then receives image data stored in a buffer memory and the like not illustrated, applies processes to the image data, and outputs the image data to the LD driver 312.

To output image data and the like received from the computer 327, the image data and command codes are accumulated in the RAM 322 and the image storage 326, and the start signal is output to the GAVD 310, without causing the scanner unit 302 to operate. The GAVD 310 then performs a screen process on the image data stored in the buffer memory and the like, and outputs the processed image data to the LD driver 312.

In the screen process, the GAVD 310 compares an eight-bit image corresponding to the input image or to an input command against a predetermined threshold table, and converts the image into one-bit image data consisting of 0 or 1. The GAVD 310 may also perform a screen process in which the image is painted out with a certain image pattern or a certain texture corresponding to the input command. Moreover, if the output of each of the beams of the VCSEL 200 has a capacity of two to four bits, the GAVD 310 may perform a screen process in which the image is converted into a corresponding two- to four-bit code. In this manner, the image is converted into a binary image or an image of a low order having a screen angle. If, in the screen process, random halftone dots are formed without any screen angle, for example, the image has no screen angle.

The LD driver 312 generates a drive controlling signal for the VCSEL 200 based on the image data received from the GAVD 310. The LD driver 312 sends the drive controlling signal to the VCSEL 200 so as to turn on the VCSEL 200. The LD driver 312 drives the semiconductor laser elements using a pulse-width modulation (PWM) control, for example.

The VCSEL 200 according to the embodiment has eight channels of semiconductor laser elements. However, the number of channels of the semiconductor laser elements is not limited thereto.

Figure 7:
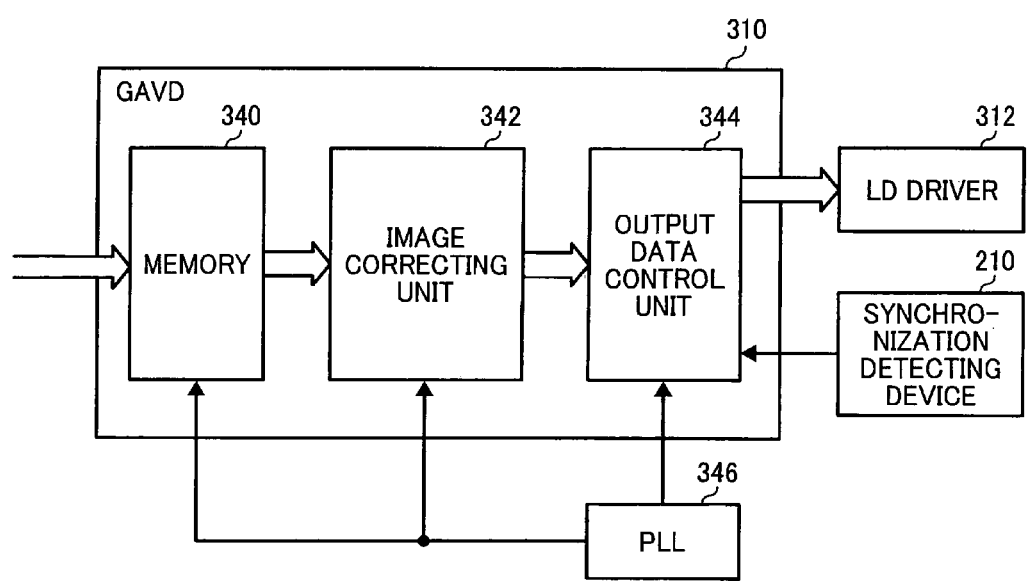
FIG. 7 is a block diagram of a detailed functional configuration of a GAVD.

FIG. 7 is a block diagram of a detailed functional configuration of the GAVD 310. The GAVD 310 receives image data from the IPU 306 and outputs processed image data to the LD driver 312. The GAVD 310 includes a memory 340, an image correcting unit 342, and an output data control unit 344. A phase lock loop (PLL) 346 and the synchronization detecting device 210 are connected to the GAVD 310.

The memory 340 receives a synchronization signal, and stores therein and records thereto the image data received from the IPU 306. The memory 340 is a memory such as a first-in first-out (FIFO) buffer and outputs the image received from the IPU 306 to the image correcting unit 342 in a first-in first-out manner.

The image correcting unit 342 reads the image data from the memory 340, and performs processes such as a resolution conversion of the image data, an assignment of a channel of the semiconductor laser elements, and addition and deletion of image bits. The last process is performed to correct the size of the image data. The image bits to be added or deleted are correction pixels used in changing the scaling of the image data.

The position of the image data to be processed and exposed on the photosensitive element 108 is defined by a main-scanning line address defined in the main-scanning direction and a sub-scanning line address defined in sub-scanning direction.

Address coordinates according to the embodiment consist of a set of a main-scanning line address (referred to as an "R address", hereinafter) and a sub-scanning line address (referred to as an "F address", hereinafter) corresponding to a particular image bit, where the image data is defined by these addresses. The address coordinates are defined for each set of pixels arranged along a line in the main-scanning direction or a line in the sub-scanning direction (in other words, for each "pixel array").

The output data control unit 344 generates a drive controlling signal for the VCSEL 200 in a manner corresponding to the image data generated by the image correcting unit 342. The output data control unit 344 converts the image data to time-sequential driving pulses based on the F addresses and the speed in the sub-scanning direction. The output data control unit 344 also generates a synchronization controlling signal that is used in applying a synchronization signal to the synchronization detecting device 210, and adds the synchronization controlling signal to a driving pulse so as to generate the drive controlling signal.

The drive controlling signal generated by the output data control unit 344 is transmitted to the LD driver 312, thereby driving the VCSEL 200. The output data control unit 344 also receives the synchronization signal from the synchronization detecting device 210 so as to synchronize transmissions of the drive controlling signals to the LD driver 312.

The operation clocks used in the processes performed by the memory 340, the image correcting unit 342, and the output data control unit 344 are synchronized using the PLL 346.

Figure 8A:
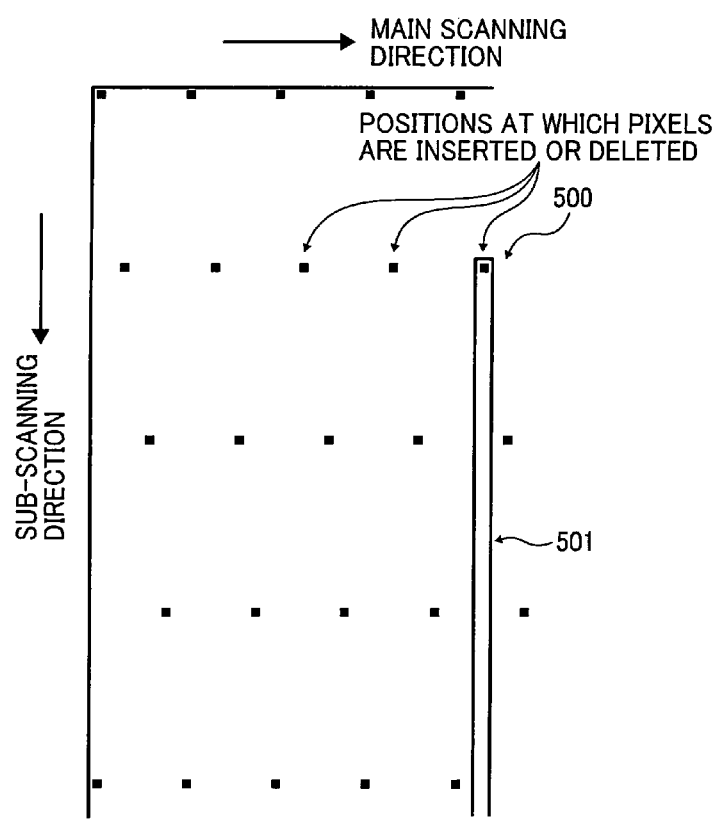
FIGS. 8A and 8B are schematics depicting how pixels included in image data are shifted in the sub-scanning direction by adding pixels to the image data.
Figure 8B:
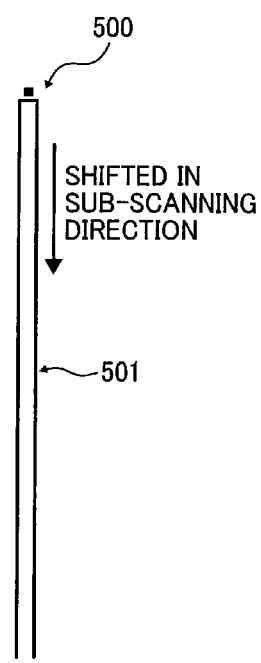

FIGS. 8A and 8B are schematics depicting how pixels included in the image data are shifted in the sub-scanning direction by adding pixels to the image data. In FIG. 8A, pixels are added to the entire image data as evenly as possible. A pixel 500 represents a position at which one pixel is added. In FIG. 8A, "added" is referred to as "inserted". FIG. 8B depicts how a pixel array 501 following the pixel 500 in the sub-scanning direction is shifted by adding the pixel 500.

FIGS. 9A to 9E are schematics for explaining how the image data is corrected by an enlarging process or a reducing process in which pixels are shifted in the sub-scanning direction. FIGS. 9A to 9C depict an example of an image in 4800 dpi. FIG. 9A represents the image before the correcting process is applied. In FIG. 9A, pixels are arranged in the order of "a0, a1, a2, a3, . . . " along the main-scanning direction from the left side of the line F0 at the top. On the next line F1, pixels are arranged in the order of "b0, b1, b2, b3, . . . ". FIGS. 9A to 9C are schematics for explaining how the pixels are arranged in the image, and these pixels are arranged one dimensionally when the image data is stored in a memory.

FIG. 9B is a schematic for indicating the positions where pixels are added or deleted. In FIG. 9B, the pixels at the positions with "*" are added or deleted. To enlarge the image, the pixels at the positions with "*" are added. To reduce the size of the image, the pixels at the positions with "*" are deleted.

FIG. 9C is a schematic of the image after reduction, and FIGS. 9D and 9E are schematics of a shift register.

A process of generating reduced image data in FIG. 9C from the image data illustrated in FIG. 9A by deleting the pixels at the positions illustrated in FIG. 9B will now be explained. In FIG. 9B, because the pixel at (F0, R0) is to be deleted, the pixel at (F1, R0) in FIG. 9A corresponds to the position (F0, R0) in the image data after the reduction. Therefore, the leftmost value in the shift register illustrated in FIG. 9D, which corresponds to the position of such a pixel, is set to "−1".

For the positions following R1 on the line F0, the pixels on the line F0 illustrated in FIG. 9A are read. Therefore, the line F0 in FIG. 9C includes pixels "b0, a1, a2, a3, . . . ". Thus, the values in the shift register are set to "−1, 0, 0, 0" (FIG. 9D).

On the line F14, because the pixel at (F14, R1) is deleted, the pixel at (F15, R1) illustrated in FIG. 9A is read. Therefore, the line F14 in FIG. 9C includes pixels "k0, k1, j2, j3". Thus, the values in the shift register are set to "−1, −1, 0, 0" (FIG. 9E).

Figure 10:
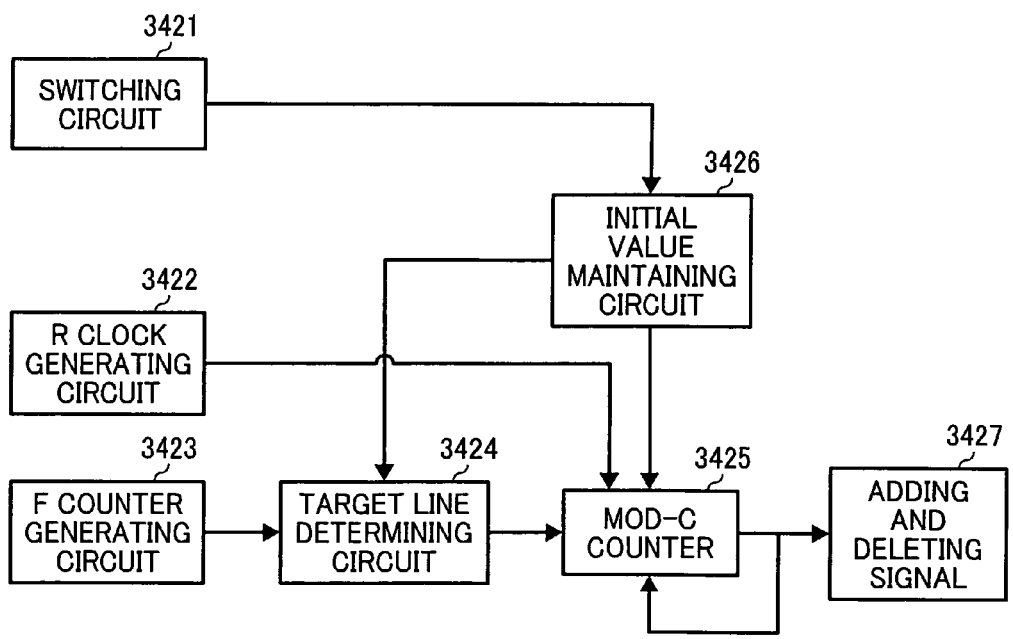
FIG. 10 is a schematic for explaining an adding signal generating circuit.

FIG. 10 is a schematic for explaining an adding signal generating circuit. The adding signal generating circuit outputs an adding and deleting signal to allow the image correcting unit 342 to determine whether to add or delete image bits. The adding signal generating circuit is arranged inside of the image correcting unit 342, for example. In the example illustrated in FIG. 9B, the positions of pixels to be added or deleted are included in every four pixels along the R address, and every 14 lines in the F address. The circuit illustrated in FIG. 10 includes a switching circuit 3421, an R clock generating circuit 3422, an F counter generating circuit 3423, an initial value maintaining circuit 3426, a target line determining circuit 3424, a mod-c counter 3425, and an adding and deleting signal 3427.

The switching circuit 3421 switches the frequency of the pixels to be added or deleted based on a switching signal issued by a CPU not illustrated, for example. The switching circuit 3421 switches initial values for each of the F addresses. The initial value maintaining circuit 3426 outputs an initial value in response to a signal received from the switching circuit 3421. The initial values of the pixels to be added or deleted are, in the example illustrated in FIG. 9, three on the line F0, and two on the line F14. This information is maintained by the initial value maintaining circuit 3426, and in this manner, the frequency of the pixels to be added or deleted is switched.

The R clock generating circuit 3422 generates an R clock signal for counting the pixels to be added or deleted. The F counter generating circuit 3423 counts the F addresses.

The target line determining circuit 3424 determines if the F addresses output by the F counter generating circuit 3423 are F addresses containing pixels to be added or deleted based on the initial value.

The mod-c counter 3425 counts the R address along an F address that contains the pixels to be added or deleted, and outputs the R address of the pixels to be added or deleted based on the initial value. The mod-c counter 3425 outputs the adding and deleting signal 3427.

Figure 11A:
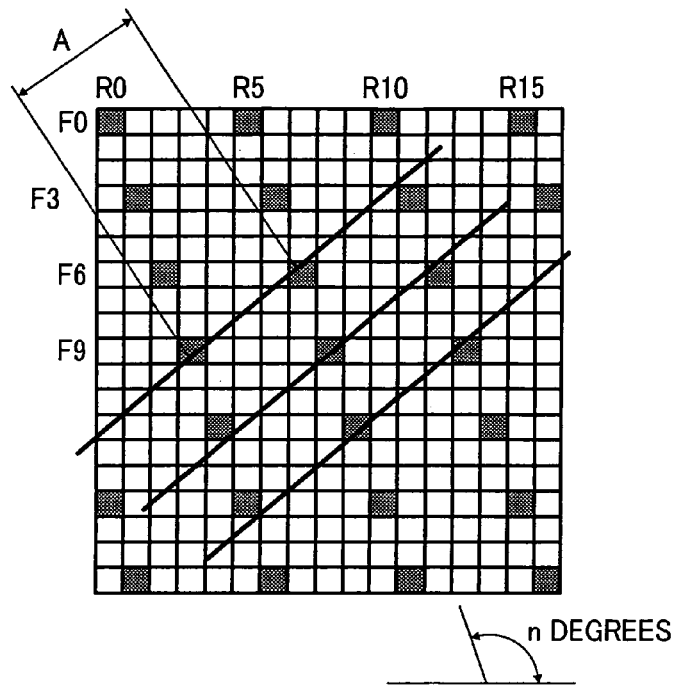
FIGS. 11A and 11B are schematics for explaining switching of an angle at which the pixels to be added or deleted are arranged.
Figure 11B:
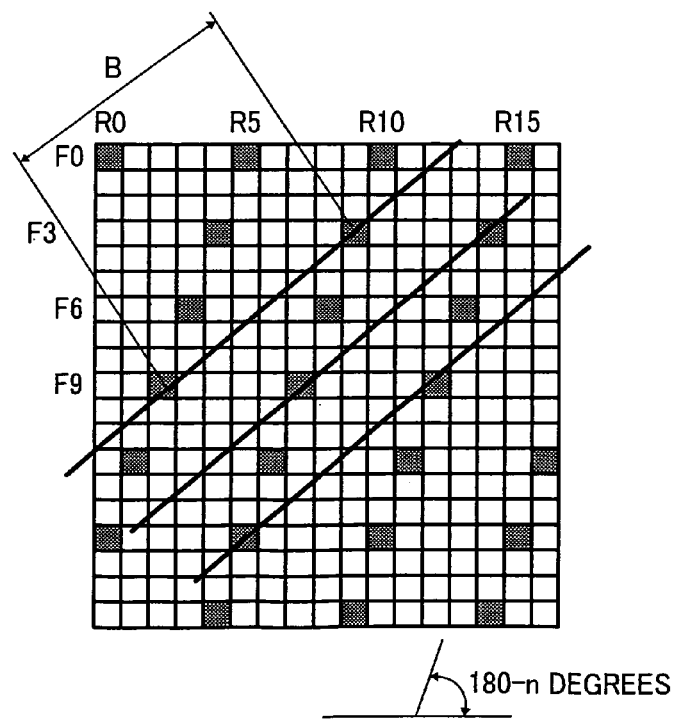

FIGS. 11A and 11B are schematics for explaining switching of an angle at which the pixels to be added or deleted are arranged. In FIGS. 11A and 11B, the frequencies of the pixels to be added or deleted are the same. More specifically, the positions of the pixels to be added or deleted are arranged periodically every three F addresses and every five R addresses.

Between the distance A of distortion in FIG. 11A and the distance B of distortion in FIG. 11B, the distance A is shorter. Therefore, a test image of FIG. 11A is output, for example, to check the distortion visually and to switch between the distance A of the distortion and the distance B of the distortion.

In FIG. 11A, the pixels are arranged at an angle of n degrees with respect to the main-scanning direction. On the contrary, in FIG. 11B, the pixels are arranged at an angle of (180−n) degrees with respect to the main-scanning direction. By switching the angle at which the pixels are arranged from n degrees to (180−n) degrees, a different distortion distance can be achieved under the same scale.

More specifically, the initial values maintained by the initial value maintaining circuit 3426 are switched. Every time the address output from the F counter generating circuit 3423 matches the F address containing pixels to be added or to be deleted, the initial values of the R addresses of the pixels to be added or deleted are switched to "4, 3, 2, 1, 0, 4, 3, . . . " in the example of FIG. 11A, and switched to "4, 0, 1, 2, 3, 4, 0, . . . " in the example of FIG. 11B.

In this manner, a distortion distance can be changed easily. The test image should be printed in the form of patches in an area outside of the image on the medium where the image is formed, for example.

Figure 12:
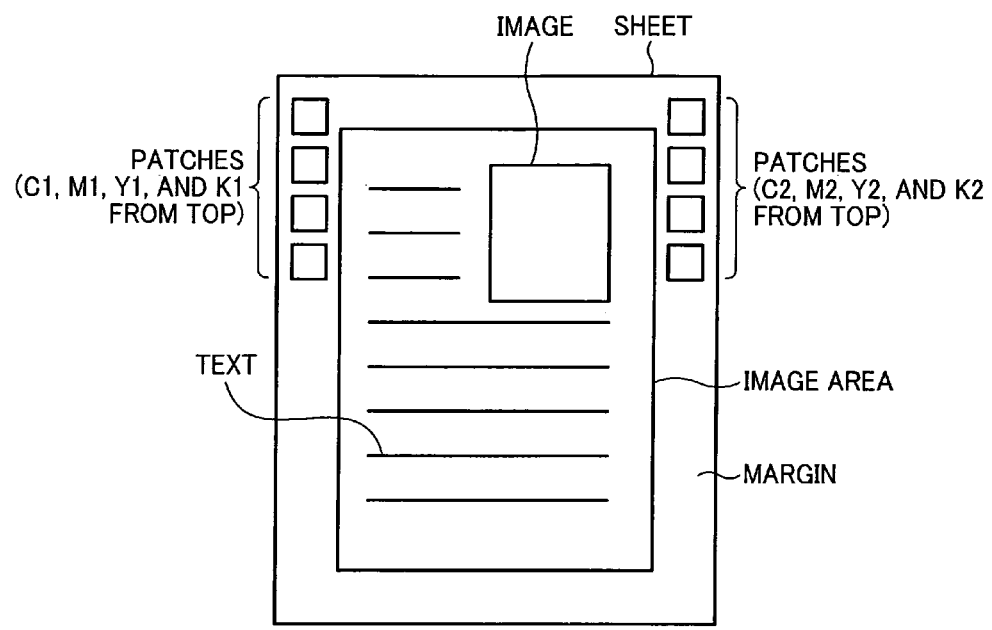
FIG. 12 is a schematic for explaining the locations where patches are printed.

FIG. 12 is a schematic for explaining locations where the patches are printed. In FIG. 12, the patches are generated outside of the image so as to allow the unevenness of the image caused by distortion to be determined visually. The print data used in printing the image contains attribute information that indicates whether the image is a text or an image. In this manner, the frequency at which the pixels are added or deleted and the distortion distance can be determined depending on whether the information has a text attribute or an image attribute, for example.

Alternatively, instead of the visual evaluation, evaluation values of the patch image evenness may be used.

In FIG. 12, patches in the respective toner colors are placed on both sides of the image area. Four toner colors, namely, C, M, Y, and K are provided, and there are two patches for each of these colors, C1, M1, Y1, and K1, and C2, M2, Y2, and K2, eight patches in total. The area on which the patches are placed may be margins.

Figure 13:
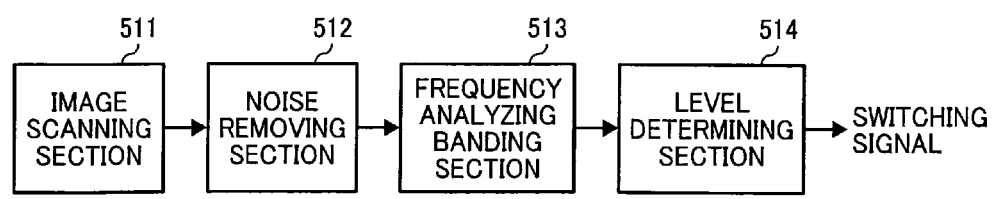
FIG. 13 is a functional block diagram for explaining a process of switching a distortion distance based on reading data of a reading sensor reading the patches.

FIG. 13 is a functional block diagram for explaining the process of switching the distortion distance based on data read by a reading sensor that reads the patches. In FIG. 13, the amount of visible banding is used in evaluating evenness of the patch images. The functional blocks illustrated in FIG. 13 include an image scanning section 511, a noise removing section 512, a frequency analyzing banding section 513, and a level determining section 514. Each of these functional sections illustrated in FIG. 13 may be provided on a main memory such as the RAM 322 by causing the CPU 320 illustrated in FIG. 6 to read a predetermined computer program.

The image scanning section 511 reads the part of the medium printed with the patches and obtains the image data of these patches. The noise removing section 512 removes noise from the image data of the read patches. In this manner, a useless evaluation value is not generated.

The frequency analyzing banding section 513 performs a frequency analysis and weighting on the image data of the patches after the noise removal. As a frequency analysis, the Fast Fourier transform (FFT) is used, for example. In the weighting, the visual transfer function (VTF) is used, for example. The VTF performs weighting based on frequency characteristics of the human eyes. In this manner, an amount of visible banding is obtained.

The level determining section 514 generates a switching signal upon determining that banding is at a high level based on the amount of visible banding thus obtained. The level of banding is determined by comparing the amount of visible banding against a predetermined threshold, for example. This switching signal changes the angle related to the distortion distance from n degrees to (180−n) degrees.

Figure 14A:
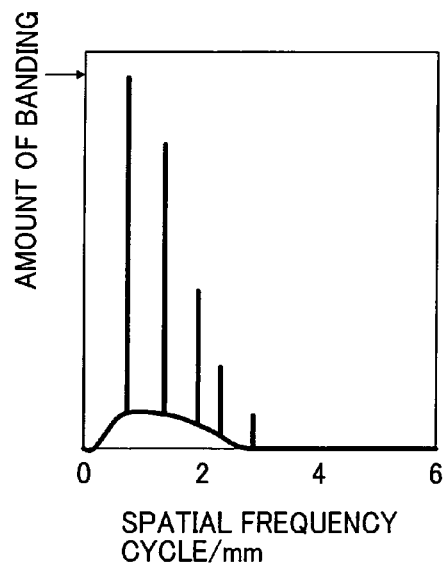
FIGS. 14A and 14B are graphs depicting a relationship between the amount of banding and a distortion.
Figure 14B:
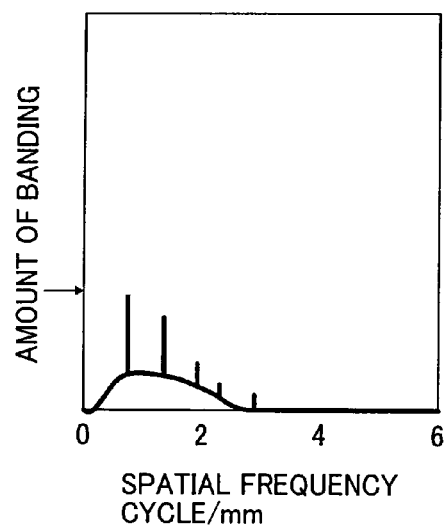

FIGS. 14A and 14B are graphs depicting the relationship between the amount of banding and distortion. In FIGS. 14A and 14B, the horizontal axis represents the spatial frequency, and the horizontal axis represents the amount of banding. FIG. 14A depicts an example in which the distortion occurring in the image is high, and FIG. 14B depicts an example in which the distortion occurring in the image is low. When the peak amount of visible banding exceeds the predetermined threshold, the level determining section 514 determines that banding occurs and generates a switching signal so as to change the angle at which the pixels to be added or deleted are arranged to (180−n) degrees. The predetermined threshold is banding of two cycles/mm, for example.

In the explanation above, an angle at which the pixels to be added or deleted are arranged is switched based on the test image. In a first variation, an angle at which the pixels to be added or deleted are arranged is changed based on the screen angle formed in the screen process.

Figure 15A:
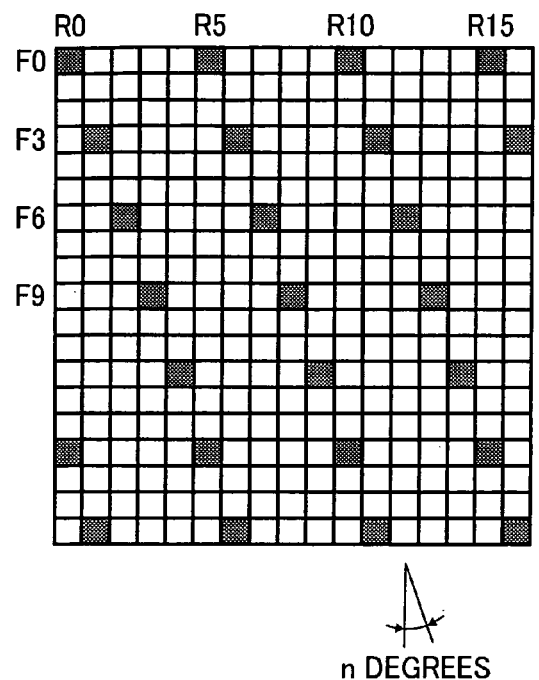
FIGS. 15A and 15B are schematics for explaining switching of an angle at which the pixels to be added or deleted are arranged.
Figure 15B:
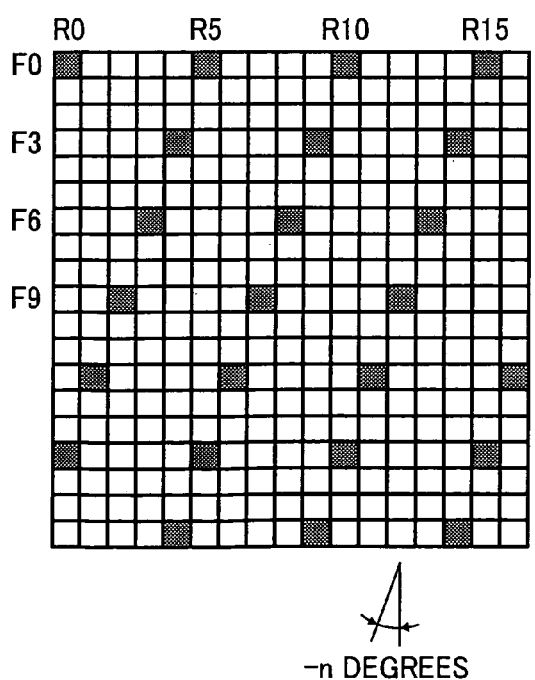

FIGS. 15A and 15B are schematics for explaining switching of an angle at which the pixels to be added or deleted are arranged. FIG. 15A is a schematic of an example in which the pixels to be added or deleted are arranged at an angle of n degrees (0<n<180) with respect to the sub-scanning direction. FIG. 15B is a schematic of an example in which the pixels to be added or deleted are arranged at an angle of (−n) degrees with respect to the sub-scanning direction.

As illustrated in FIGS. 15A and 15B, in the first variation, the angle at which the pixels to be added or deleted are arranged is switched so that these pixels are arranged at symmetrical angles with respect to the sub-scanning direction. In the explanation below, changing the angle at which the pixels to be added or deleted are arranged from the angle n degrees illustrated in FIG. 15A to the angle (−n) degrees illustrated in FIG. 15B is referred to as mirroring.

In the same manner as in the example illustrated in FIGS. 11A and 11B, angles can be switched simply by switching the initial values of the mod-c counter 3425. Therefore, such a configuration can be achieved in a simple circuit structure. In FIGS. 15A and 15B, for the purpose of explanation, the pixels to be added or deleted are illustrated near each other. In practice, to realize an enlargement or reduction of approximately 0.3 percent by shifting the pixels, for example, the line interval at which the pixels are inserted or deleted in the sub-scanning direction is set to five along the sub-scanning direction, and 68 is used as the absolute value of increments in the main-scanning direction. These values are maintained in the form of a data table corresponding to each of the scales in the ROM 324 and the like.

An effect of switching the angles will now be explained with reference to FIGS. 16 to 19. FIGS. 16 to 19 are schematics of an image laid at a certain screen angle.

Figure 16:
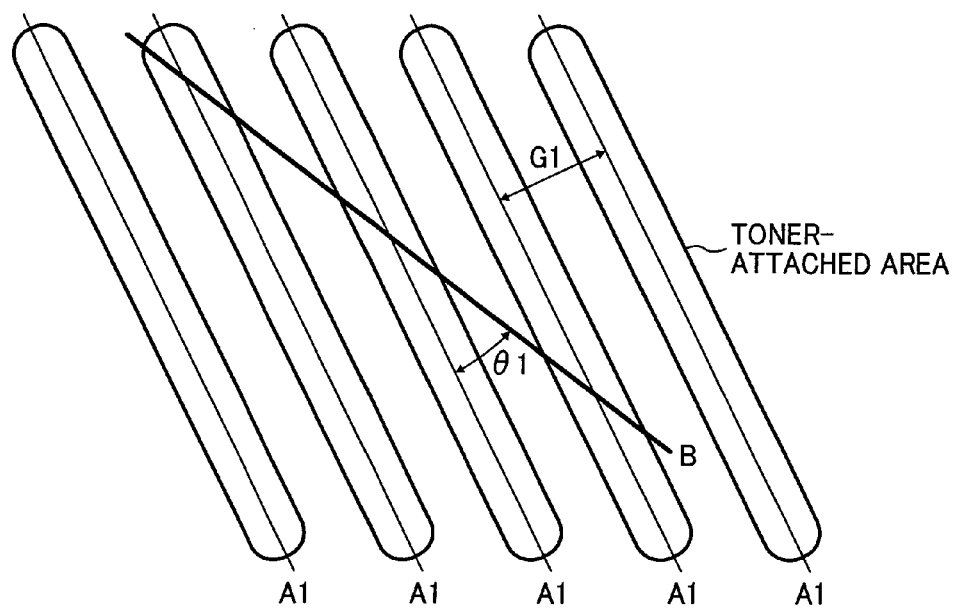
FIG. 16 is a schematic of a toner-attached image before a shifting operation is performed.

FIG. 16 is a schematic of a toner-attached image before the shifting operation is performed. The distances G1 between the lines A1 formed by a screen are all the same. At this time, the line along which pixels to be inserted or deleted are arranged for shifting is denoted as B, and the angle formed between the line B and the line A1 is denoted as θ1.

Figure 17:
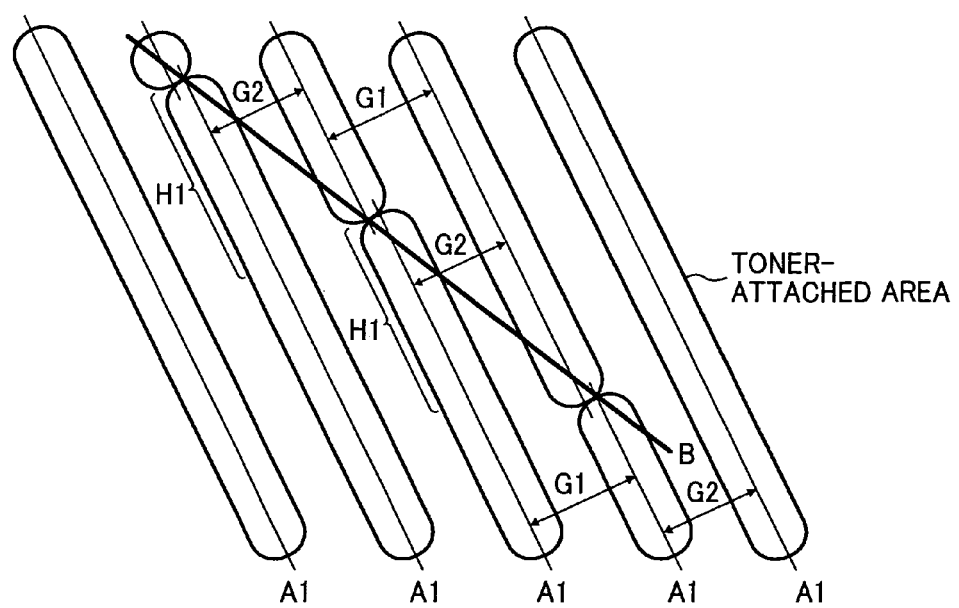
FIG. 17 is a schematic of an image after the shifting operation is applied to the image illustrated in FIG. 16.

FIG. 17 is a schematic of an image after the shifting operation is applied to the image illustrated in FIG. 16. As a result of the shifting operation, the portion below the line B at which the pixels are deleted is shifted upwardly in FIG. 17. Because of this shift, the distance between the lines at the screen angle becomes G2 approximately within the area H1. The distance G2 is different from the distance G1 in the other portion or the distance G1 illustrated in FIG. 16. Because the distance G2 is smaller than the distance G1, the density of the area H1 is recognized as darker. Because the remaining portion still has the distance G1, such a difference is recognized as density unevenness in the image on the sheet.

Figure 18:
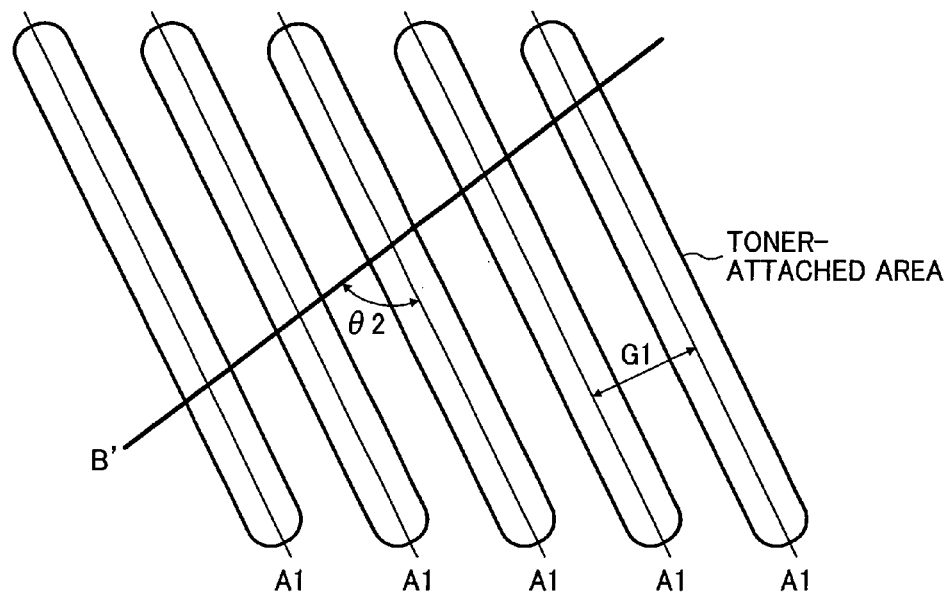
FIG. 18 is a schematic of an example in which a line along which the pixels to be inserted or deleted are arranged for a shifting operation is mirrored with respect to the sub-scanning direction.

FIG. 18 is a schematic of an example in which the line along which the pixels to be inserted or deleted are arranged for the shifting operation is mirrored with respect to the sub-scanning direction. FIG. 18 depicts the image before the shifting operation is performed. The angle formed between the lines A1 laid at the screen angle and the line B' along which the pixels to be inserted or deleted are arranged for the shifting operation is θ2.

Figure 19:
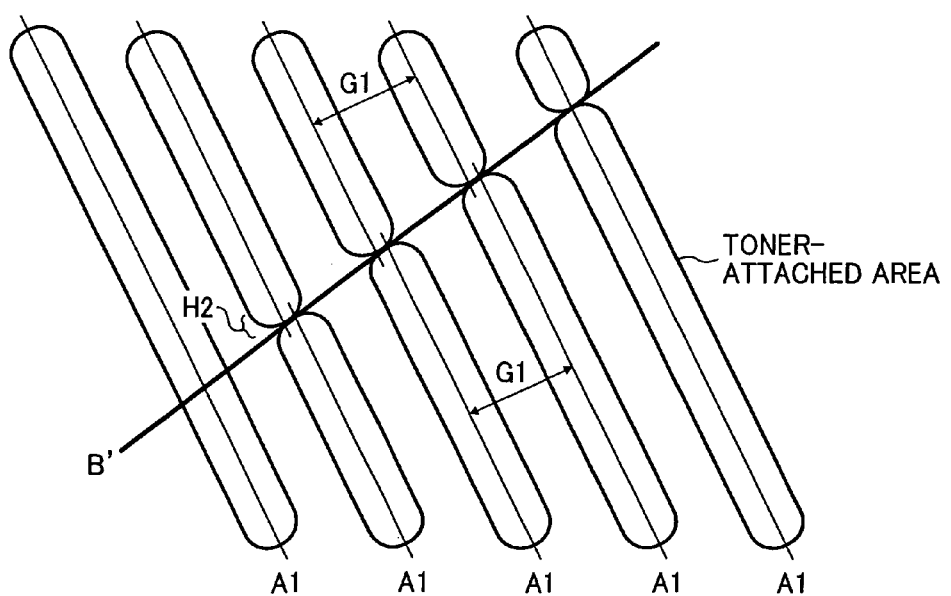
FIG. 19 is a schematic of an image after the shifting operation is applied to the image illustrated in FIG. 18.

FIG. 19 is a schematic of the image after the shifting operation is applied to the image illustrated in FIG. 18. The difference in the distance occurring in FIG. 17 hardly occurs in FIG. 19. Therefore, despite that the area in which density unevenness is recognized (H1) occurs across a wide area in FIG. 17, the area in which density unevenness is recognized (H2) does not almost occur in FIG. 19. Therefore, the density unevenness is not visually recognized on the sheet.

H1 and H2 are proportional to |cos(θ1)| and |cos(θ2)|, respectively. Therefore, it is possible to determine which one of H1 and H2 is larger in length by calculating the cosines (cos) of these two.

In other words, |cos(θ1)| and |cos(θ2)| are calculated for the angle θ formed between the direction of the screen and the line along which the pixels to be inserted or deleted for the shifting operation are arranged so as to check which ones of FIGS. 16 to 19 are applicable. The calculation results are proportional to the respective lengths of the areas H1 and H2. Smaller one of these values is then selected. In this manner, the length of the portions H1 or H2 can be reduced so as to prevent formation of density unevenness.

In the examples illustrated in FIGS. 16 to 19, the pixels to be inserted or deleted for the shifting operation should be arranged along the line B' illustrated in FIG. 18 because $|\cos(\theta 1)| > |\cos(\theta 2)|$.

Figure 20A:
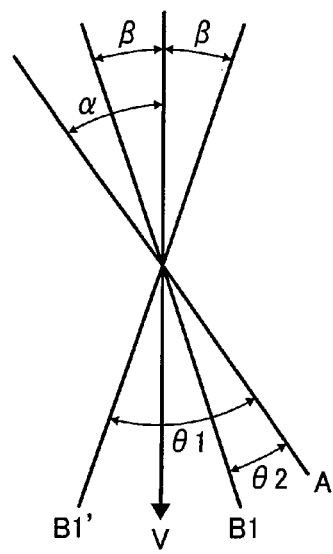
FIGS. 20A and 20B are schematics for explaining about switching of the angles in greater detail.
Figure 20B:
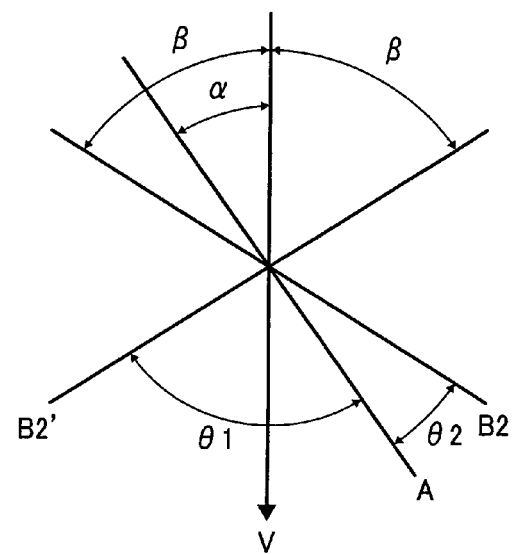

FIGS. 20A and 20B are schematics for explaining about switching of the angles in greater detail. V indicates the sub-scanning direction. A indicates the direction of the screen. The angle $\alpha$ indicates the angle of the direction A of the screen with respect to the sub-scanning direction V. The angle $\beta$ indicates the angle of the direction of the line along which the pixels to be inserted or deleted are arranged with respect to the sub-scanning direction V.

FIG. 20A depicts an example of a line B1 or B1' along which the pixels to be inserted or deleted are arranged when $\alpha \geq \beta$. FIG. 20B depicts an example of a line B2 or B2' along which the pixels to be inserted or deleted are arranged when $\alpha < \beta$.

When $\alpha \geq \beta$, $\theta 1 = \alpha + \beta$ and $\theta 2 = \alpha - \beta$. When $\alpha < \beta$, $\theta 1 = \alpha + \beta$ and $\theta 2 = \beta - \alpha$. Therefore, by calculating $|\cos(\theta 1)|$ and $|\cos(\theta 2)|$, it can be determined whether the pixels to be inserted or deleted should be mirrored.

Figure 21:
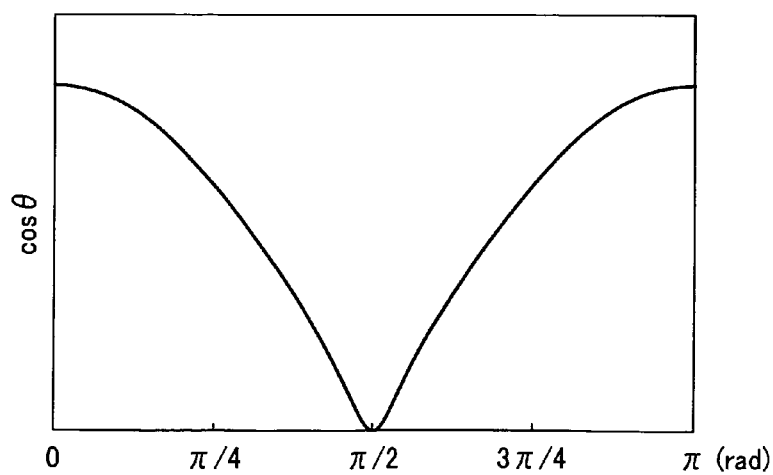
FIG. 21 is a graph indicating values of $\cos\theta$ when $\theta$ is within the range from 0 to $\pi$(rad)

FIG. 21 is a graph indicating values of $\cos \theta$ when $\theta$ is within the range from 0 to $\pi$(rad). When $\theta$ is within the range from 0 to $\pi$(rad), $\cos \theta$ will be as illustrated in FIG. 21. Therefore, calculations of the cosines can be further simplified. For example, the cosine can be calculated by calculating each of $\theta 1$ and $\theta 2$, and the difference thereof with respect to 0(rad), $\pi$(rad), and $\pi/2$(rad) and by correcting the difference, or by referring to a table associating the differences and the cosines.

Figure 22:
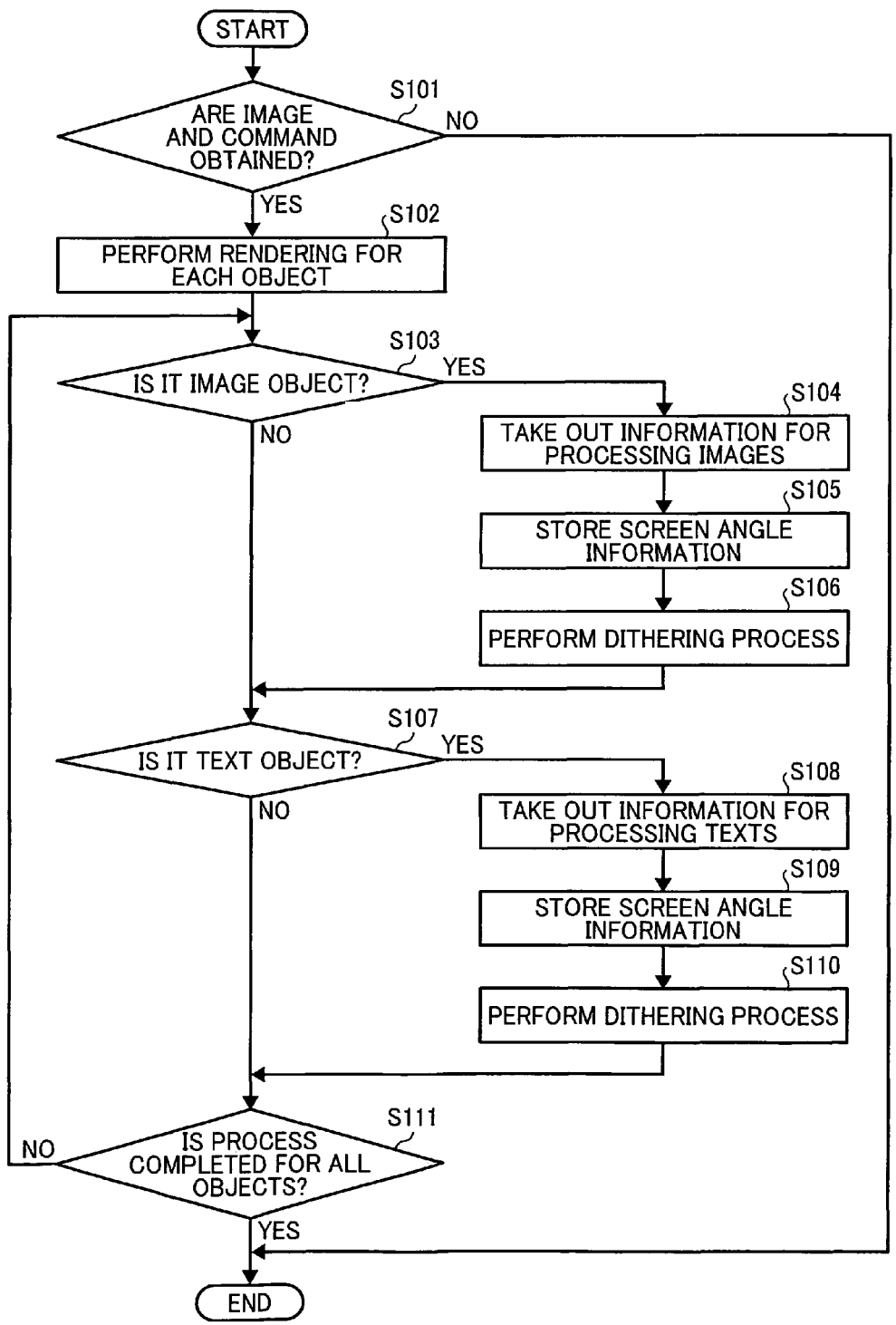
FIG. 22 is a flowchart of the entire image process applied to an image for one page.

An operation in which the image data and the like is output from the computer 327 connected to the interface 328 will now be explained. FIG. 22 is a flowchart of the entire image process applied to an image for one page.

The CPU 320 obtains the image data and a command via the interface 328 (YES at Step S101). If no image data or command is obtained, the image processing is ended (NO at Step S101). The CPU 320 interprets the command thus obtained, and classifies objects into image objects, such as image data and an image object generated by a graphics command, and text objects such as characters, and performs various initializations for rendering the image (Step S102). The image objects include photograph objects as well.

The CPU 320 determines if an object is an image object (Step S103). If the object is an image object (YES at Step S103), the GAVD 310 takes out information such as a dither parameter and information associated with the dither parameter such as a screen angle from the ROM 324 as information used in the screen process of image objects (Step S104). When such information is specified by a user, the information specified and stored by the user is taken out from the RAM 322.

The CPU 320 stores the information related to the screen angle for the screen process in the RAM 322 (Step S105). The information related to the screen angle includes, for example, a flag indicating whether the process uses a regular screen angle and the angle of the screen angle in the process using a regular screen angle.

The GAVD 310 then refers to the information for the screen process and executes the screen process (dithering process) (Step S106).

If the object is not an image object (NO at Step S103), the CPU 320 further determines if the object is a text object (Step S107). If the object is a text object (YES at Step S107), the GAVD 310 takes out information required in the screen process for text objects (information such as a dither parameter and information associated with the dither parameter such as a screen angle) from the ROM 324 (Step S108). The CPU 320 stores the information of the screen angle for the screen process in the RAM 322 (Step S109).

The GAVD 310 then refers to the information for the screen process and executes the screen process (dithering process) (Step S110).

If the CPU 320 determines that the object is a text object at Step S107 (NO at Step S107), or when the CPU 320 determines if the process is completed for every object (Step S111) after Step S110 to determine that the process is not completed (NO at Step S111), the system control returns to Step S103 and the process is repeated. If the process is completed (YES at Step S111), the image processing performed on the image for one page is ended.

The image of one page thus generated is then stored in the memory 340. Alternatively, the image may be divided into a plurality of band-like areas consisting of a plurality of lines in the main-scanning direction, and the images may be generated almost simultaneously as the issue of a request for a laser output (on the fly).

FIG. 23 is a flowchart of the entire image shifting controlling process.

To begin with, the GAVD 310 determines if the image applied with the screen process has been prepared for one page (Step S201). If the image has not been prepared (NO at Step S201), the image shifting controlling process is ended.

If the image has been prepared (YES at Step S201), the GAVD 310 determines if image shifting has been requested (Step S202). If the image shifting has not been requested (NO at Step S202), the GAVD 310 sets the shift register to the settings for not executing image shifting (Step S203).

If image shifting is requested (YES at Step S202), the GAVD 310 refers to the information stored in the RAM 322 (the flag indicating whether the process uses a regular screen angle), for example, so as to determine if a screen process with a regular screen angle is being used (Step S204).

If a screen process with a regular screen angle is being used (YES at Step S204), the GAVD 310 obtains the angle information indicating the screen angle to be used in the screen process (Step S205). For example, if processing information for an image object is stored, the GAVD 310 obtains the screen angle used for image objects. If such information is not stored, the GAVD 310 obtains the screen angle for text objects. By prioritizing the information for image objects, it is possible to prevent distortion from being recognized visually in image objects that are largely affected when the image is distorted by insertion or deletion of pixels.

The GAVD 310 then obtains image shifting information (a predetermined angle at which the pixels are shifted) (Step S206). The angle thus obtained, and the angle thus obtained mirrored with respect to the sub-scanning direction are used as predetermined specified angles at which the pixels to be added or deleted are arranged.

The GAVD 310 calculates two patterns of cosines corresponding to these two specified angles (Step S207). The GAVD 310 compares the two patterns of calculation results and determines if mirroring is to be applied (Step S208). The GAVD 310 determines that mirroring is to be applied when the cosine of the mirrored angle is smaller than the cosine of the angle without mirroring.

If mirroring is to be applied (YES at Step S208), the GAVD 310 sets the shift register to a mirroring mode so as to mirror the angle at which the pixels to be added or deleted are arranged (Step S209).

If the GAVD 310 determines that a screen process with a regular screen angle is not used at Step S204 (NO at Step S204), or if the GAVD 310 determines that no mirroring is to be applied at Step S208 (NO at Step S208), the GAVD 310 sets the shift register so as not to mirror the angle at which the pixels to be added or deleted are arranged (Step S210). In this manner, when a screen process with a regular screen angle is not used, the image is shifted at the predetermined angle (the angle without being mirrored). In this manner, the same image quality can always be assured. Alternatively, when a screen process with a regular screen angle is not used, the mirrored angle may be used in shifting the image.

After setting the shift register at Steps S203, S209, and S210, the GAVD 310 controls the image output (Step S211).

With such a process, control with the shifting operation of inserting or deleting the pixels can be performed easily without causing any defect in the image. Because simple calculations can be used to reduce the pitch variation in the screen process, distortion can be kept visually unrecognizable even if the image is distorted by inserting or deleting the pixels.

The image processing apparatus according to the embodiment may be realized in a personal computer (PC), for example. Furthermore, the image processing method according to the embodiment may be executed by a CPU following computer programs stored in a ROM or a hard disk drive, for example, by using a main memory such as a RAM as a working area.

With the image processing apparatus and the image processing method according to one aspect of the embodiment of the present invention, it is possible to provide an image processing apparatus and an image processing method that can easily reduce image quality degradation caused by enlargement and reduction.

The present invention may be implemented as an image processing method executed in the image processing apparatus.

According to one aspect of the embodiment of the present invention, it is possible to provide an image processing apparatus that can easily reduce image quality degradation caused by enlargement and reduction.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus comprising:
a correcting unit that performs enlarging or reducing correction on an image to be processed by determining an arrangement of pixels that are to be added to or deleted from gradational image data of the image to be processed based on an angle at which the pixels are to be arranged with respect to a horizontal direction of the image to be processed or with respect to a vertical direction of the image to be processed; and
a pixel array control unit that changes the angle at which the pixels are arranged based on a test image of the image data to be processed after being corrected by the correcting unit, wherein
the angle at which pixels added or deleted in the test image are arranged is n degrees, where 0<n<180, and
the pixel array control unit changes the angle at which the pixels to be added to or deleted from the image data to be processed are arranged to an angle of (180−n) degrees.

2. The image processing apparatus according to claim 1, further comprising:
a printing unit that prints the test image; and
a characteristic obtaining unit that obtains density characteristics of test image data obtained by reading the test image thus printed, wherein
the pixel array control unit changes the angle at which the pixels to be added or deleted are arranged in the image data to be processed based on the density characteristics.

3. The image processing apparatus according to claim 1, wherein
the test image includes a plurality of patches each corresponding to an ink color used by the printing unit to print an image, and
the patches are printed outside of an area of an image printed by the printing unit on a medium.

4. An image processing method comprising:
performing enlarging or reducing correction on an image to be processed by determining an arrangement of pixels that are to be added to or deleted from gradational image data of the image to be processed based on an angle at which the pixels are to be arranged with respect to a horizontal direction of the image to be processed or with respect to a vertical direction of the image to be processed; and
changing the angle at which the pixels are arranged based on a test image of the image data to be processed after being corrected at the performing correction, wherein
the angle at which pixels added or deleted in the test image are arranged is n degrees, where 0<n<180, and
the angle at which the pixels to be added to or deleted from the image data to be processed are arranged to an angle of (180−n) degrees.

5. An image processing apparatus comprising:
a correcting unit that performs enlarging or reducing correction on an image to be processed by determining an arrangement of pixels that are to be added to or deleted from gradational image data of the image to be processed based on an angle at which the pixels are to be arranged with respect to a horizontal direction of the image to be processed or with respect to a vertical direction of the image to be processed; and
a pixel array control unit that changes the angle at which the pixels to be added to or deleted from the image data to be processed are arranged depending on a screen angle formed in a screen process applied to the image data to be processed, wherein
the pixel array control unit changes the angle at which the pixels to be added to or deleted from the image data to be processed are arranged to one of a plurality of predetermined specified angles whose cosine of a difference with the screen angle is smallest.

6. The image processing apparatus according to claim 5, wherein the specified angels are n degrees with respect to a sub-scanning direction and −n degrees with respect to the sub-scanning direction.

7. The image processing apparatus according to claim 5, wherein the pixel array control unit changes the angle at which the pixels to be added to or deleted from the image data to be processed are arranged based on a screen angle applied to image data of image objects included in the image to be processed.

8. The image processing apparatus according to claim 5, wherein the pixel array control unit changes the angle at which the pixels to be added to or deleted from the image data to be processed are arranged to a predetermined angle when no screen process is applied to the image data to be processed.

* * * * *